US010484862B2

United States Patent
Chauhan et al.

(10) Patent No.: US 10,484,862 B2
(45) Date of Patent: Nov. 19, 2019

(54) SYSTEM AND METHODS FOR AVAILING SERVICES IN AN INTERNATIONAL ROAMING BY USING PROACTIVE COMMANDS

(71) Applicant: RELIANCE JIO INFOCOMM LIMITED, Mumbai-Maharashtra (IN)

(72) Inventors: Devesh Chauhan, Maharashtra (IN); Ganesh Arjun Mote, Maharashtra (IN); Viraj Dadia, Mumbai-Maharashtra (IN); Vinita Rupanagudi, Mumbai-Maharashtra (IN); Hiren Patel, Mumbai-Maharashtra (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/322,222

(22) PCT Filed: Jul. 28, 2017

(86) PCT No.: PCT/IB2017/054607
§ 371 (c)(1),
(2) Date: Jan. 31, 2019

(87) PCT Pub. No.: WO2018/029567
PCT Pub. Date: Feb. 15, 2018

(65) Prior Publication Data
US 2019/0166484 A1 May 30, 2019

(30) Foreign Application Priority Data
Aug. 10, 2016 (IN) .............................. 201621027310

(51) Int. Cl.
H04W 8/18 (2009.01)
H04W 4/02 (2018.01)
(Continued)

(52) U.S. Cl.
CPC ............. *H04W 8/183* (2013.01); *H04W 4/02* (2013.01); *H04W 8/06* (2013.01); *H04W 8/12* (2013.01);
(Continued)

(58) Field of Classification Search
CPC ......... H04W 8/06; H04W 8/12; H04W 8/183; H04W 8/205; H04W 8/26
See application file for complete search history.

(56) References Cited

U.S. PATENT DOCUMENTS

2005/0101323 A1   5/2005  Beer
2005/0192007 A1*  9/2005  Kumar .................... H04W 8/06
                                                           455/433

(Continued)

FOREIGN PATENT DOCUMENTS

WO         2013017042        2/2013

OTHER PUBLICATIONS

PCT International Search Report, International Application No. PCT/IB2017/054607, dated Oct. 27, 2017, pp. 1-3.
(Continued)

*Primary Examiner* — Diane D Mizrahi
(74) *Attorney, Agent, or Firm* — Hunton Andrews Kurth LLP

(57) ABSTRACT

Embodiments of the present disclosure relate to availing at least one service by a user equipment while one of in an international roaming and leaving the international roaming. In a preferred embodiment, a method for automatic IMSI switching by using the proactive commands such as PLI commands, while entering and leaving the international roaming, independent of the cause code sent by any operator and can work regardless of the cause code received is disclosed. The method includes replacing of the home IMSI of the user equipment with the global IMSI in an event the
(Continued)

at least one network parameter corresponds to the second location and replacing of the global IMSI of the user equipment with the home IMSI in an event the at least one network parameter corresponds to the first location.

17 Claims, 3 Drawing Sheets

(51) Int. Cl.
  *H04W 64/00* (2009.01)
  *H04W 8/12* (2009.01)
  *H04W 8/20* (2009.01)
  *H04W 8/06* (2009.01)
  *H04W 8/26* (2009.01)
(52) U.S. Cl.
  CPC ........... *H04W 8/205* (2013.01); *H04W 64/00* (2013.01); *H04W 8/26* (2013.01)

(56) References Cited

U.S. PATENT DOCUMENTS

| | | | |
|---|---|---|---|
| 2009/0264126 A1* | 10/2009 | Khetawat | H04L 63/104 455/435.1 |
| 2009/0265542 A1* | 10/2009 | Khetawat | H04L 63/104 713/151 |
| 2009/0265543 A1* | 10/2009 | Khetawat | H04L 63/104 713/151 |
| 2012/0309374 A1 | 12/2012 | Tagg | |
| 2013/0102308 A1 | 4/2013 | Patil et al. | |

OTHER PUBLICATIONS

ETSI, Universal Mobile Telecommunications System (UMTS); LTE; Non-Access-Stratum (NAS); Protocol for Evolved Packet System (EPS); Stage 3 (3GPP TS 24.301 version 10.3.0 Release 10), 2011, pp. 1-308.

* cited by examiner

SYSTEM AND METHODS FOR AVAILING SERVICES IN AN INTERNATIONAL ROAMING BY USING PROACTIVE COMMANDS

TECHNICAL FIELD

The present disclosure generally relates to mobile communications and is more specifically, directed to systems and methods for availing services from a foreign network while a mobile user is in international roaming.

BACKGROUND

A subscriber identity module (SIM) configured in a mobile device or a smart device in the form of a chip card contains essential individual subscriber data that is required for facilitating mobile services. A typical SIM card comprises an integrated circuit chip that is intended to securely store the international mobile subscriber identity (IMSI) number and the related key/s, which may be used to identify and authenticate subscribers/users on the mobile devices along with other information including, but not limiting to, its unique serial number (ICCID), international mobile subscriber identity (IMSI) number and security authentication and ciphering information. SIM cards are typically designed to be transferable between different mobile devices. Further, the SIM circuit forms a part of the function of a Universal Integrated Circuit Card (UICC) physical smart card (referred to as 'SIM' card herein). Also, the SIM comprises a SIM file system that further consists of the Master File (MF), Dedicated Files (DFs) and the Elementary Files (EFs) that are mainly used for controlling the user equipment's (UE) behaviour in the network by facilitating a secured registration to desired network, deciding which services should be restricted and allowed and subsequently maintaining a status list of the EF and DF files.

Further, each subscriber is identified by a unique International Mobile Subscriber Identity (IMSI) which consists of the PLMN (MCC, MNC) of a network operator and the Mobile Subscription Identification Number (MSIN). There are different network operators (either available in same country or different country) which provide such voice and data services to subscribers not only of their own subscribers but also from other networks. Therefore, in an exemplary instance, of international roaming, when the subscriber (Roaming Subscriber (RS)) leaves the home network and moves to a foreign location (Roamed Network (RN)), the user equipment receives services from another network within the same country due to unavailability of the home network as per bilateral roaming agreements between the home and the roamed network operators.

In recent years, wireless communication networks have undergone tremendous growth and commercialization, thereby resulting in increased number of services and features offered on such devices. Therefore, it has now become essential to provide good quality roaming network for maintaining a network operator's brand value for roaming services, since these network operators provide a plurality of subscribed services to the users/subscribers by facilitating registration, authentication, location updating, handovers, call routing, etc. Currently, the wireless networks are being configured to provide an Auto IMSI Switch SIM application in case of international roaming by facilitating swapping the IMSI (home IMSI) of the home network operator with an IMSI (Global IMSI) of a global Network Operator. With the updated IMSI, the user equipment may easily avail services in international roaming. However, there are two prerequisites for successful functioning of the Auto IMSI Switch, one of which is that the Auto IMSI Switch SIM application is able to detect rejection of user equipment's in attempting to attach to the available network followed by the second prerequisite that the SIM application is able to affirm that the user equipment is in the international location.

Additionally, for efficient swapping of the IMSI, the user equipment should be able to communicate with the subscriber identity module using a variety of commands such as proactive commands (as specified in the 3GPP TS 31.111 standard, including, but not limiting to, PROVIDE LOCAL INFORMATION (PLI) and REFRESH). The PLI proactive command is typically used to request the user equipment to transmit the current local information directly to the subscriber identity module, wherein the current local information includes but not limited to, local information relating to user equipment, IMEI, network measurement results, current date and time zones, language settings, current access technology, current network search mode and battery status. Further, in situations where the attach request of the user equipment cannot be accepted by the international roaming network, the international roaming network rejects the attach request based on appropriate cause code value specified in the 3GPP TS 24.301, including, but not limiting to, Illegal user equipment, unavailability of cells in tracking area, non-allowable EPS service, non-allowable tracking area and non-allowable PLMN. The existing technologies for Auto IMSI Switch SIM application provide a solution by using a particular Elementary File (EF) of the SIM card viz. $EF_{FPLMN}$. When the user equipment having the home IMSI sends the attach request to the international roaming network and receives an attach reject with reject Cause such as "PLMN Not Allowed", the user equipment updates the Forbidden PLMN list in the USIM FPLMN elementary file ($EF_{FPLMN}$) with the PLMN value of the roamed network from which it received the reject message resulting in triggering of the Auto IMSI Switch SIM application to replace the home IMSI by global IMSI. Thereupon, when the user equipment having the global IMSI re-sends the attach request, the international roaming network will be attached successfully with the user equipment. Similarly, the Auto IMSI Switch SIM application can be triggered when the user returns back to the home network from the international roaming. However, these existing solutions for Auto IMSI Switch SIM application poses certain limitations, one of which is inability to update the $EF_{FPLMN}$ values when the reject cause is not "PLMN Not Allowed" i.e. in the event the reject cause is not "PLMN Not Allowed", the Auto IMSI Switch SIM application cannot be triggered. Thus, this Auto IMSI Switch SIM application is not a robust criteria.

Another limitation relates to a limited amount of memory and processing power available on the SIM card. In an exemplary event, the size of $EF_{FPLMN}$ may vary from subscriber identity module to subscriber identity module based on the operator requirements and therefore, different user equipments update the $EF_{FPLMN}$ differently based on their implementation since there is no standard definition to update the FPLMN list. Therefore, this approach is less efficient and poses certain limitations, inter alia, the Auto IMSI Switch SIM application compares the updated values with the previous values to detect the updation.

Accordingly, in order to overcome the aforementioned problems inherent in the existing solutions for Auto IMSI Switch SIM application, there exists a need of an efficient mechanism to create holistic criteria for Auto IMSI Switch SIM application by using the PLI proactive commands independent of the cause code sent by any user and can work regardless of the cause code received.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for availing at least one service by a user equipment while in an international roaming, the method comprising: transmitting, by the user equipment, an attach request to at least one second network in an event the user equipment having a home IMSI is in the international roaming by entering a second location from a first location, wherein the first location is served by at least one first network and the second location is served by the at least one second network, and the home IMSI corresponds to the first location; receiving, by the user equipment, an attach reject in response to the attach request, wherein the attach reject is received from the at least one second network; updating, by the user equipment, at least one location parameter of the second location at the subscriber identity module, wherein the subscriber identity module is configured at the user equipment, and the at least one location parameter has an associated status; analysing, by the subscriber identity module, the associated status of the at least one location parameter of the second location; requesting, by the subscriber identity module, to receive at least one network parameter of the at least one second network from the user equipment in an event the associated status of the at least one location parameter corresponds to the attach reject; communicating, by the user equipment, the at least one network parameter of the at least one second network to the subscriber identity module, wherein the at least one network parameter comprises a mobile country code of the second location; replacing the home IMSI of the user equipment with a global IMSI, by the subscriber identity module, in an event the at least one network parameter corresponds to the second location; re-transmitting, by the user equipment having the global IMSI, the attach request to the at least one second network; and availing, by the user equipment, the at least one service while in the international roaming in an event the at least one second network accepts the attach request with the global IMSI.

Further, the embodiments of the present disclosure encompass a method for availing at least one service by a user equipment while leaving an international roaming, the method comprising: transmitting, by the user equipment, an attach request to at least one first network in an event the user equipment having a global IMSI leaves the international roaming by entering a first location from a second location, wherein the first location is served by at least one first network and the second location is served by the at least one second network; receiving, by the user equipment, an attach reject in response to the attach request, wherein the attach reject is received from the at least one first network; updating, by the user equipment, at least one location parameter of the first location at the subscriber identity module, wherein the subscriber identity module is configured at the user equipment, and the at least one location parameter has an associated status; analysing, by the subscriber identity module, the associated status of the at least one location parameter of the first location; requesting, by the subscriber identity module, to receive at least one network parameter of the at least one first network from the user equipment in an event the associated status of the at least one location parameter corresponds to the attach reject; communicating, by the user equipment, the at least one network parameter of the at least one first network to the subscriber identity module, wherein the at least one network parameter comprises a mobile country code of the first location; replacing the global IMSI of the user equipment with a home IMSI, by the subscriber identity module, in an event the at least one network parameter corresponds to the first location, wherein the home IMSI corresponds to the first location; re-transmitting, by the user equipment having the home IMSI, the attach request to the at least one first network; and availing, by the user equipment, the at least one service while leaving the international roaming in an event the at least one first network accepts the attach request with the home IMSI.

Moreover, the embodiments of the present disclosure encompass a system for availing at least one service by a user equipment while one of in an international roaming and leaving the international roaming, the system comprising: a user equipment configured to: transmit an attach request to at least one second network in an event the user equipment having a home IMSI is in the international roaming by entering a second location from a first location, and transmit an attach request to at least one first network in an event the user equipment having a global IMSI leaves the international roaming by entering the first location from the second location, wherein the first location is served by at least one first network and the second location is served by the at least one second network, and the home IMSI corresponds to the first location; receive an attach reject event in response to the attach request from one of the at least one first network and the at least one second network; update at least one location parameter of one of the first location and the second location at a subscriber identity module, wherein the subscriber identity module is configured at the user equipment, and the at least one location parameter has an associated status; communicate at least one network parameter of one of the at least one second network and the at least one first network to the subscriber identity module, wherein the at least one network parameter of the at least one first network and the at least one second network comprises a mobile country code of the first location and the second location, respectively; the subscriber identity module configured to: analyse the associated status of the at least one location parameter of one of the first location and the second location; request to receive the at least one network parameter of one of the at least one second network and the at least one first network from the user equipment in an event the associated status of the at least one location parameter corresponds to the attach reject; replace the home IMSI of the user equipment with the global IMSI in an event the at least one network parameter corresponds to the second location; replace the global IMSI of the user equipment with the home IMSI in an event the at least one network parameter corresponds to the first location; wherein, the user equipment having one of the home IMSI and the global IMSI is configured to re-transmit the attach request to one of the at least one first network and the at least one second network to avail the at least one service while one of in the international roaming and leaving the international roaming in an event the at least one first network and the at least one second network accepts the home IMSI and the global IMSI, respectively.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings.

Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
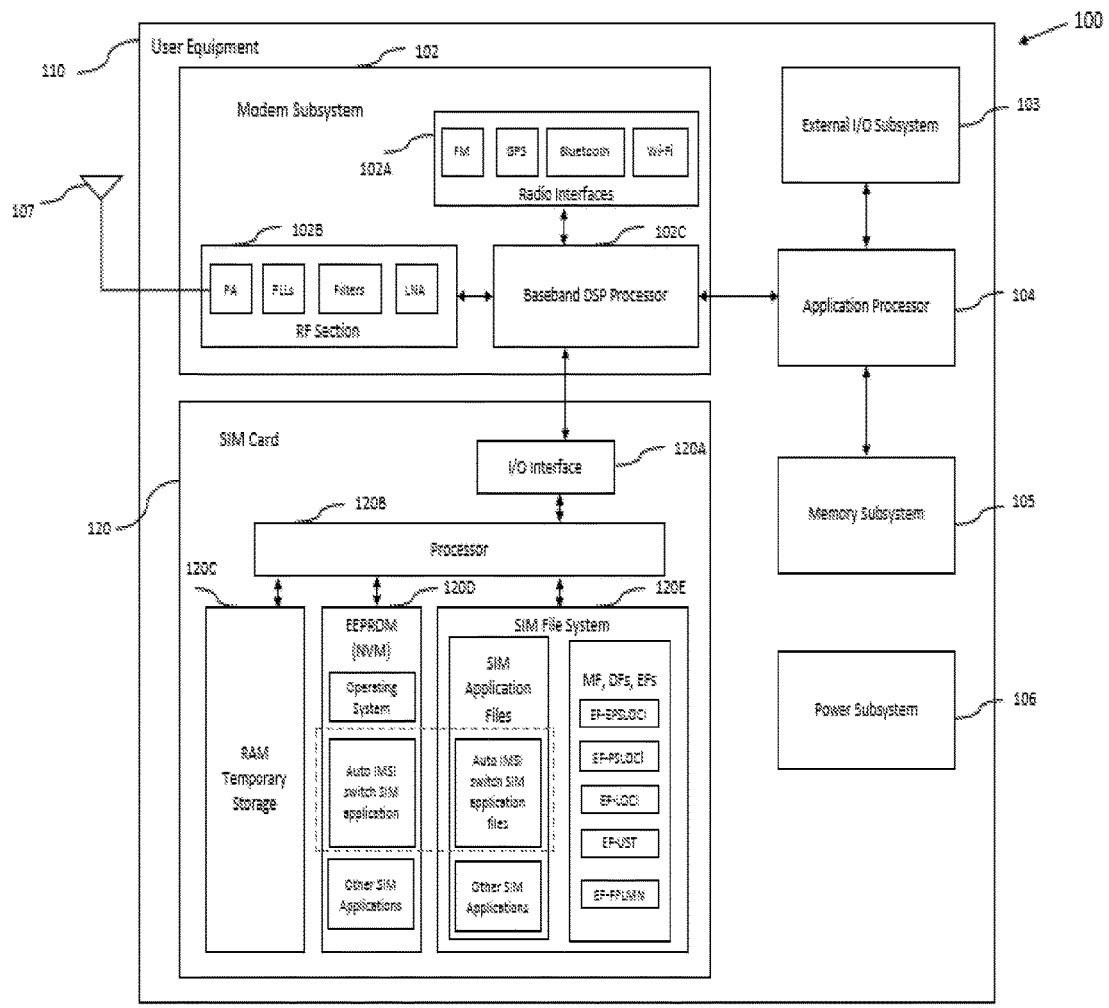
FIG. 1 illustrates a system architecture [100] for availing at least one service by a user equipment while one of in an international roaming and leaving the international roaming in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and methods for availing a service by a user equipment when user is either in an international roaming or is leaving the international roaming. The system comprises a user equipment and a subscriber identity module configured inside the user equipment for providing functionalities in accordance with the present invention. Further, the user equipment, present within a first network, communicates with a second network for availing services when the user equipment is in international roaming, provided the second network may have the bilateral agreement with the service provider of the subscriber identity module. Similarly, the user equipment, present within the second network, communicates with the first network for availing services when the user equipment leaves international roaming. Furthermore, the user equipment may have more than one or two subscriber identity modules configured to operate either one at a time or all at the same.

The at least one service as used herein may comprise at least one of a voice call, multimedia broadcast multicast message, a voice message, a short message service, a VoIP data, a video data and internet data.

The user equipment as used herein may refer to any computing device operable with a subscriber identity module (SIM), wherein the subscriber identity module comprises an IMSI, a unique key shared with the network operator. The user equipment present in a home location may have a home IMSI, while the user equipment present in an international location (second location) may have a global IMSI. Further, the user equipment includes, but not limited to, a smart phone, a mobile phone, a tablet, a phablet and any such device as obvious to a person skilled in the art. Furthermore, the user equipment may comprise an input means such as a keyboard, an operating system, a memory unit, a display interface, etc. which functions/communicates with other entities such as base station or any such network equipment with the help of the subscriber identity module.

The first location as used herein may refer to the home location of the subscriber identity module, wherein the first location is served by at least one first network i.e. the at least one first network provide the at least one service to the user equipment located in the home location.

The second location as used herein may refer to any international location other than the home location of the subscriber identity module, wherein the second location is served by at least one second network i.e. the at least one second network i.e. the at least one second network provide the at least one service to the user equipment located in the second location.

The international roaming as used herein may refer to any event when the user equipment avails services while travelling outside the geographical coverage area of the home location.

FIG. 1 illustrates a preferred embodiment of the present disclosure which encompasses a system architecture for availing at least one service by a user equipment when a user is either in an international roaming or is leaving the international roaming. The system [100] comprises a user equipment [110] and a subscriber identity module [120] configured inside the user equipment for providing various functionalities in accordance with the present invention. The user equipment [110] further comprises a plurality of sub systems [102, 102A, 120B, 102C, 103, 104, 105 and 106]. Further, the subsystems [102, 102A, 120B, 102C, 103, 104, 105 and 106] comprised within the user equipment [110] may include, but not limiting to, a modem subsystem [102] with a Baseband DSP processor [102C] and a plurality of radio interfaces [102A]. The user equipment [110] may further include a cellular radio [102B] transmission/reception radio frequency (RF) connected to the antenna [107] for receiving and transmitting wireless services such as VoIP and Internet/Intranet services. Also, the user equipment [110] may comprise an application processor [104], a memory subsystem [105], a power subsystem [106] and an external I/O interfaces subsystem [103].

The present invention further encompasses that the subscriber identity module [120] comprises a processor [120B], an I/O interface [120A], a RAM temporary storage [120C], an EEPROM/Non-volatile Memory (NVM) [120D] and a SIM file system [120E]. Further, the EEPROM/Non-Volatile Memory (NVM) [120D] consists of an operating system code, a code of other SIM applications and the Auto IMSI Switch SIM application. The SIM file system [120E] and USIM application contains elementary files and location parameters such as $EF_{LOCI}$ (Location Information), $EF_{PSLOCI}$ (PS Location Information), $EF_{EPSLOCI}$ (PS Location Information) and various application specific files used by SIM applications running on the subscriber identity module [120] along with a plurality of context and configuration files of the Auto IMSI Switch SIM application. The present invention also encompasses storage of information related to the home IMSI and the global IMSI in the Auto IMSI Switch SIM application.

In an event, the user having the user equipment [110] enters into the international roaming when travels from the first location to the second location, the user equipment [110] may not be able to avail any services since the IMSI of the subscriber identity module [120] remains home IMSI and the user [110] having the home IMSI may not be permitted to avail services from the second location.

The user equipment [110] having the home IMSI may, therefore, further be configured to scan the at least one second network available in the second location to transmit an attach request to the at least one second network, wherein the attach request comprises either the home IMSI or the global IMSI. The attach request comprises the home IMSI in an event the user equipment [110] travels from the first location to the second location. The user equipment [110] may further receive an attach reject in response to the attach request from the at least one second network in an event the home network operator may not have the bilateral roaming agreement with the network operator in the international location into which the subscriber is roaming. The attach reject comprises at least one EMM cause of the network rejection, wherein the at least one EMM cause of the network rejection includes, but not included to, Illegal UE, Illegal ME, EPS services not allowed, EPS services and non-EPS services not allowed, PLMN not allowed, Tracking area not allowed, Roaming not allowed in this tracking area, EPS services not allowed in this PLMN, No suitable cells in tracking area, Congestion, Not authorized for this CSG, Requested service option not authorized in this PLMN, Severe network failure.

On receiving the attach reject, the user equipment [110] may be configured to update the at least one location parameter ($EF_{LOCI}$ (Location Information), $EF_{PSLOCI}$ (PS Location Information), $EF_{EPSLOCI}$ (PS Location Information)) of the second location at the subscriber identity module [120], wherein each of the at least one location parameter of the second location has an associated status. The associated status of the at least one location parameter of the second location indicates one of a attach reject and an attach acceptance by the at least one second network. In a preferred embodiment, the updation of the at least one location parameter of the second location is based on the radio access technology of the at least one second network from which the user equipment [110] has received the attach reject. This updation of the at least one location parameter of the second location further triggers the auto IMSI Switch SIM application. In a preferred embodiment, the user equipment [110] may notify an event data to the subscriber identity module [120], wherein the event data comprises an update of at least one elementary file present in the subscriber identity module [120].

The subscriber identity module [120] may further be configured to analyse the associated status of each of the at least one location parameter of the second location, wherein the process of analysis further includes checking whether or not the associated status of the at least one location parameter is updated. In an event, the associated status of the at least one location parameter indicates the attach reject, the subscriber identity module [120] requests the user equipment [110] to receive at least one network parameter of the at least one second network by transmitting the proactive command such as PROVIDE LOCAL INFORMATION (PLI) command.

On receiving the PROVIDE LOCAL INFORMATION (PLI) command from the subscriber identity module [120], the user equipment [110] may be configured to communicate at least one network parameter of the at least second network, wherein the at least one network parameter includes a mobile country code of the second location, but not limited to, a mobile network code of the second location. In a preferred embodiment, the user equipment [110] may determine the at least one network parameter of the at least second network based on the Auto IMSI switch SIM application residing in the subscriber identity module [120] and subsequently communicate the same to the subscriber identity module [120].

The user equipment [110] further communicates a terminal response containing, but not including, the at least one network parameter of the at least one second network to the subscriber identity module [120], pursuant to which the subscriber identity module [120] may be configured to replace the home IMSI with the global IMSI based on at least one of the information related to elementary files, the home IMSI and the global IMSI in the Auto IMSI Switch SIM application, the at least one second network and the at least one first network in an event the at least one network parameter corresponds to the second location. The present invention therefore, encompasses replacing of the home IMSI with the global IMSI, irrespective of the cause code sent by the user by using the proactive commands.

Further, the user equipment [110] having the global IMSI may now be configured to re-scan the at least one second network available in the second location to transmit the attach request to the at least one second network, wherein the attach request will now comprise the global IMSI of the user equipment [110]. In an event any one of the at least one second network operator has the bilateral roaming agreement with the network operator in the international location into which the subscriber is roaming, the at least one second network accepts the new attach attempt of the user equipment [110], the user equipment [110] may be enabled to avail the at least one service while in the international roaming. In another embodiment, when the user having the user equipment [110] travels further to a new location other than the home location, the user equipment [110] having the global IMSI may be served by a set of new networks (other than the at least one first network) subject to the bilateral agreement between the home and the roamed network operators.

Similarly, in another instance, the user having the user equipment [110] with the global IMSI leaves the international roaming, when travels back to the first location from the second location, the user equipment [110] having the global IMSI may further be configured to scan at least one first network available in the first location to transmit an attach request to the at least one first network, wherein the attach request comprises the global IMSI. The user equipment [110] may further receive an attach reject in response to the attach request from the at least one first network in an event the global IMSI is not switched back to the home IMSI. The attach reject comprises at least one EMM cause of the network rejection, wherein the at least one EMM cause of the network rejection includes, but not included to, Illegal UE, Illegal ME, EPS services not allowed, EPS services and non-EPS services not allowed, PLMN not allowed, Tracking area not allowed, Roaming not allowed in this tracking area, EPS services not allowed in this PLMN, No suitable cells in tracking area, Congestion, Not authorized for this CSG, Requested service option not authorized in this PLMN, Severe network failure.

Further, on receiving the attach reject, the user equipment [110] may be configured to update the at least one location parameter (EF$_{LOCI}$ (Location Information), EF$_{PSLOCI}$ (PS Location Information), EF$_{EPSLOCI}$ (PS Location Information)) of the first location at the subscriber identity module [120], wherein each of the at least one location parameter of the first location has an associated status. The associated status of the at least one location parameter of the first location indicates one of an attach reject and an attach acceptance by the at least one first network. In a preferred embodiment, the updation of the at least one location parameter of the first location is based on the radio access technology of the at least one first network from which the user equipment [110] has received the attach reject. This updation of the at least one location parameter of the first location further triggers the auto IMSI Switch SIM application. In a preferred embodiment, the user equipment [110] may notify an event data to the subscriber identity module [120], wherein the event data comprises update of at least one elementary file present in the subscriber identity module [120].

The subscriber identity module [120] may further be configured to analyse the associated status of each of the at least one location parameter of the first location, wherein the process of analysis further includes checking whether or not the associated status of the at least one location parameter is updated. In an event, the associated status of the at least one location parameter indicates the attach reject, the subscriber identity module [120] requests the user equipment [110] to receive at least one network parameter of the at least one first network by transmitting the proactive command such as PROVIDE LOCAL INFORMATION (PLI) command.

On receiving the PROVIDE LOCAL INFORMATION (PLI) command from the subscriber identity module [120], the user equipment [110] may be configured to communicate at least one network parameter of the at least first network, wherein the at least one network parameter includes a mobile country code of the second location, but not limited to, a mobile network code of the first location. In a preferred embodiment, the user equipment [110] may determine the at least one network parameter of the at least first network based on the Auto IMSI switch SIM application residing in the subscriber identity module [120] and further communicate the same to the subscriber identity module [120].

The user equipment [110] further communicates a terminal response containing, but not including, the at least one network parameter of the at least first network to the subscriber identity module [120], pursuant to which the subscriber identity module [120] may be configured to replace the global IMSI with the home IMSI based on at least one of the information related to the elementary files, the home IMSI and the global IMSI in the Auto IMSI Switch SIM application, the at least one second network and the at least one first network in an event the at least one network parameter corresponds to the first location.

Further, the user equipment [110] having the home IMSI may now be configured to re-scan the at least one first network available in the first location to transmit the attach request to the at least one first network, wherein the attach request will now comprise the home IMSI of the user equipment [110]. Consequently, the user equipment [110] may be enabled to avail the at least one service while leaving the international roaming.

Figure 2:
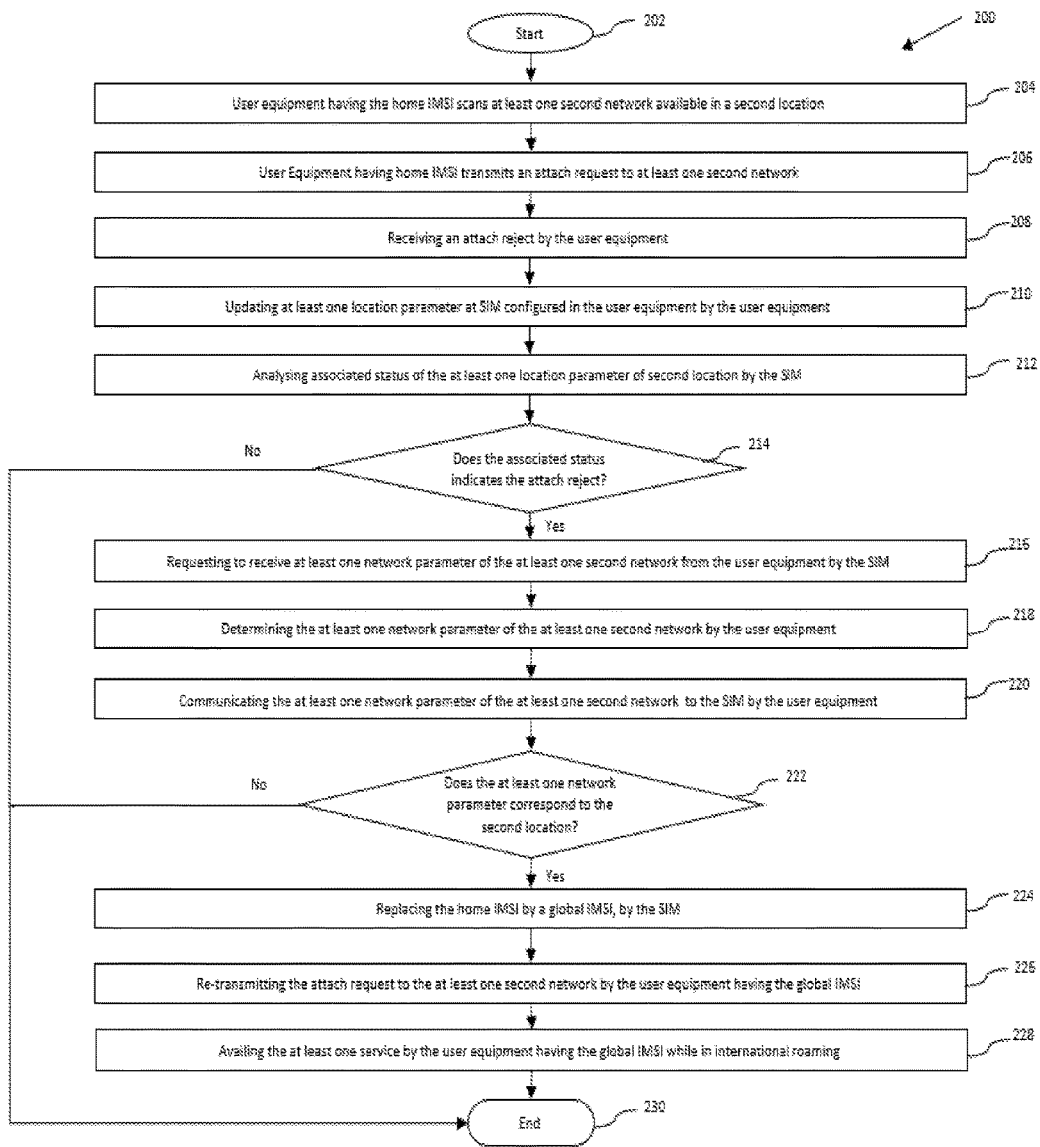
FIG. 2 illustrates an exemplary method flow diagram [200] comprising the method for availing at least one service by a user equipment while in an international roaming in accordance with an embodiment of the present disclosure.

As illustrated in FIG. 2, the present disclosure encompasses an exemplary method [200] for availing at least one service by a user equipment while in an international roaming in accordance with an embodiment of the present disclosure, wherein the method may be performed by the user equipment [110] and the subscriber identity module [120] by using the proactive commands. The following includes detailed steps involved in availing at least one service by a user equipment in an international roaming. The method step may initiate at step 202 where the user having the user equipment [110] with the home IMSI travels from the first location to the second location while entering the international roaming. The user having the user equipment [110] enters into the international roaming when travels from the first location to the second location, and may not be able to avail any services since the IMSI of the subscriber identity module remains home IMSI.

At step 204, the user equipment [110] having the home IMSI may be configured to scan the at least one second network available in the second location.

At step 206 and after the accomplishment of the step 204, the user equipment [110] may transmit the attach request to the at least one second network, wherein the attach request comprises the home IMSI.

At step 208, the user equipment [110] may further receive an attach reject in response to the attach request from the at least one second network in an event the home network operator may not have the bilateral roaming agreement with the network operator in the international location into which the subscriber is roaming.

At step 210, the user equipment [110], on receiving the attach reject, may be configured to update the at least one location parameter (EF$_{LOCI}$ (Location Information), EF$_{PSLOCI}$ (PS Location Information), EF$_{EPSLOCI}$ (PS Location Information)) of the second location at the subscriber identity module [120], wherein each of the at least one location parameter of the second location has the associated status. The associated status of the at least one location parameter of the second location indicates one of a attach reject and an attach acceptance by the at least one second network. In a preferred embodiment, the updation of the at least one location parameter of the second location is based on the radio access technology of the at least one second network from which the user equipment [110] has received the attach reject. This updation of the at least one location parameter of the second location further triggers the auto IMSI Switch SIM application. In a preferred embodiment, the user equipment [110] may notify an event data to the subscriber identity module [120], wherein the event data comprises update of at least one elementary file present in the subscriber identity module [120].

At step 212, the subscriber identity module [120] may analyse the associated status of each of the at least one location parameter of the second location.

At step 214, the process of analysis further includes checking whether or not the associated status of the at least one location parameter is updated. In an event, the associated status of the at least one location parameter indicates the attach reject, the method [200] leads to step 216, else the method [200] may terminate at step 230.

At step 216, the subscriber identity module [120] may request the user equipment [110] to receive at least one network parameter of the at least one second network by transmitting the proactive command such as PROVIDE LOCAL INFORMATION (PLI) command.

At step 218, the user equipment [110] may determine the at least one network parameter of the at least second network, wherein the at least one network parameter includes a mobile country code of the second location, but not limited to, a mobile network code of the second location. In a preferred embodiment, the user equipment [110] may determine the at least one network parameter of the at least second network based on the Auto IMSI switch SIM application residing in the subscriber identity module [120].

At step 220, the user equipment [110] may communicate the terminal response containing, but not including, the at least one network parameter of the at least one second network to the subscriber identity module [120].

At step 222, the subscriber identity module [120] may check whether or not the at least one network parameter of the at least second network corresponds to the second location. In an event the at least one network parameter corresponds to the second location, the method [200] may lead to step 224. Alternately, the method [200] may terminate at step 230.

At step 224, the subscriber identity module [120] may be configured to replace the home IMSI with the global IMSI based on at least one of the information related to the elementary files, the home IMSI and the global IMSI in the Auto IMSI Switch SIM application, the at least one second network and the at least one first network by using the proactive commands.

At step 226, the user equipment [110] having the global IMSI may re-scan the at least one second network available in the second location to re-transmit the attach request to the at least one second network, wherein the attach request will now comprise the global IMSI of the user equipment [110].

At step 228, the at least one second network accepts the new attach attempt of the user equipment [110] and the user equipment [110] may be enabled to avail the at least one service while in the international roaming in an event any one of the at least one second network operator has the bilateral roaming agreement with the network operator in the international location into which the subscriber is roaming. The method [200] terminates at the step 230.

Figure 3:
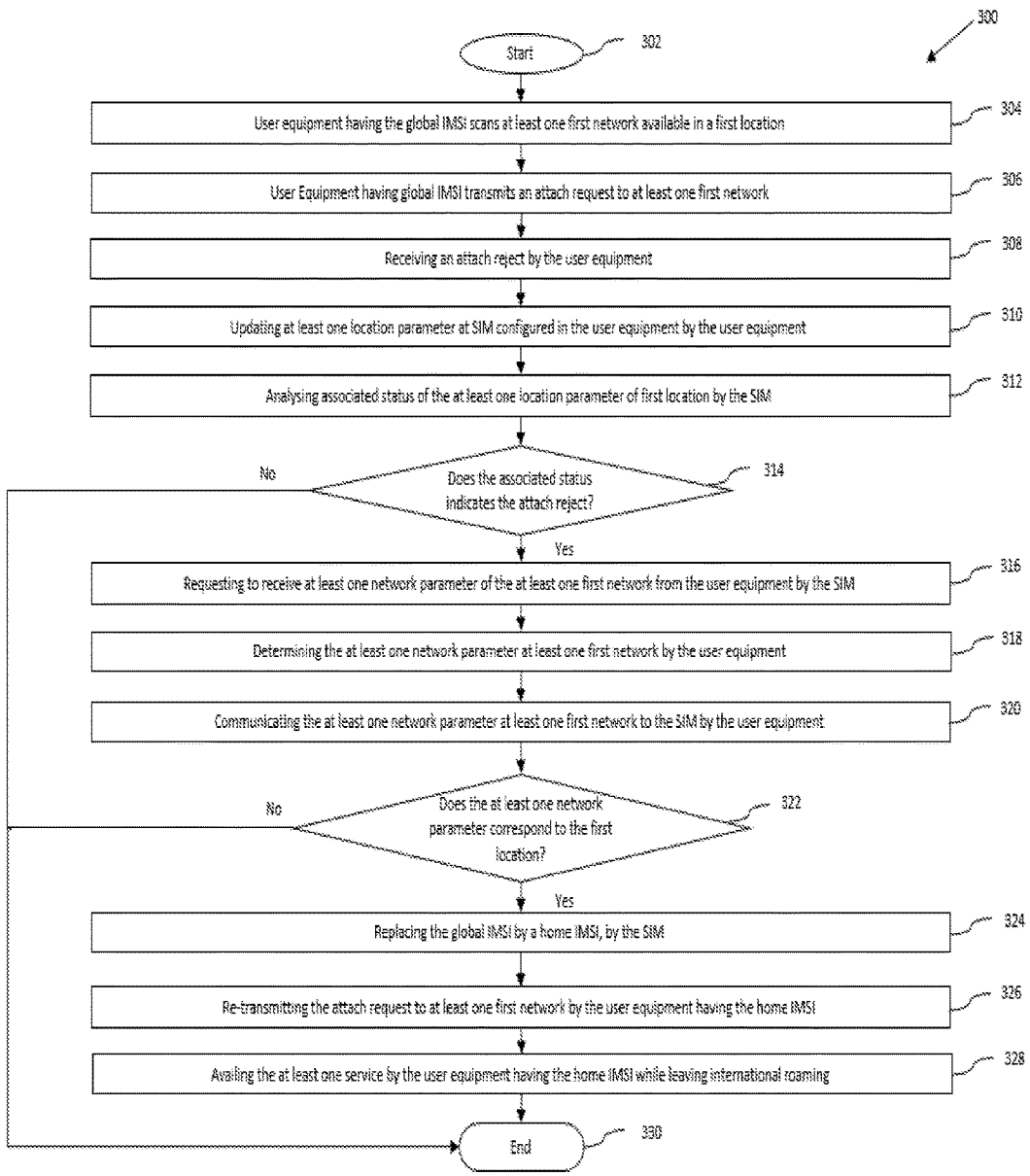
FIG. 3 illustrates an exemplary method flow diagram [300] comprising the method for availing at least one service by a user equipment while leaving an international roaming in accordance with an embodiment of the present disclosure.

As illustrated in FIG. 3, the present disclosure encompasses an exemplary method [300] for availing at least one service by the user equipment while leaving an international roaming in accordance with an embodiment of the present disclosure, wherein the method may be performed by the user equipment [110] and the subscriber identity module [120] by using the proactive commands. The following includes detailed steps involved in availing at least one service by the user equipment while leaving the international roaming. The method step may initiate at step 302 where the user having the user equipment [110] with the global IMSI travels back to the first location from the second location while leaving the international roaming. The user having the user equipment [110] leaves the international roaming when travels from the second location to the first location, and may not be able to avail any services since the IMSI of the subscriber identity module remains global IMSI.

At step 304, the user equipment [110] having the global IMSI may be configured to scan the at least one first network available in the first location.

At step 306 and after the accomplishment of the step 304, the user equipment [110] may transmit the attach request to the at least one first network, wherein the attach request comprises the global IMSI.

At step 308, the user equipment [110] may further receive an attach reject in response to the attach request from the at least one first network in an event the global IMSI is not switched back to the home IMSI.

At step 310, the user equipment [110], on receiving the attach reject, may be configured to update the at least one location parameter ($EF_{LOCI}$ (Location Information), $EF_{PSLOCI}$ (PS Location Information), $EF_{EPSLOCI}$ (PS Location Information)) of the first location at the subscriber identity module [120], wherein each of the at least one location parameter of the first location has an associated status. The associated status of the at least one location parameter of the first location indicates one of a attach reject and an attach acceptance by the at least one first network. In a preferred embodiment, the updation of the at least one location parameter of the first location is based on the radio access technology of the at least one first network from which the user equipment [110] has received the attach reject. This updation of the at least one location parameter of the first location further triggers the auto IMSI Switch SIM application. In a preferred embodiment, the user equipment [110] may notify an event data to the subscriber identity module [120], wherein the event data comprises update of at least one elementary file present in the subscriber identity module [120].

At step 312, the subscriber identity module [120] may analyse the associated status of each of the at least one location parameter of the first location.

At step 314, the process of analysis further includes checking whether or not the associated status of the at least one location parameter is updated. In an event, the associated status of the at least one location parameter indicates the attach reject, the method [300] leads to step 316, else the method [300] may terminate at the step 330.

At step 316, the subscriber identity module [120] may request the user equipment [110] to receive at least one network parameter of the at least one first network by transmitting the proactive command such as PROVIDE LOCAL INFORMATION (PLI) command.

At step 318, the user equipment [110] may determine the at least one network parameter of the at least first network, wherein the at least one network parameter includes a mobile country code of the first location, but not limited to, a mobile network code of the first location. In a preferred embodiment, the user equipment [110] may determine the at least one network parameter of the at least first network based on the Auto IMSI switch SIM application residing in the subscriber identity module [120].

At step 320, the user equipment [110] may communicate the terminal response containing, but not including, the at least one network parameter of the at least one first network to the subscriber identity module [120].

At step 322, the subscriber identity module [120] may check whether or not the at least one network parameter of the at least first network corresponds to the first location. In an event the at least one network parameter corresponds to the first location, the method [300] may lead to step 324. Alternately, the method [300] may terminate at the step 330.

At step 324, the subscriber identity module [120] may be configured to replace the global IMSI with the home IMSI based on at least one of the information related to the elementary files, the home IMSI and the global IMSI in the Auto IMSI Switch SIM application, the at least one second network and the at least one first network by using the proactive commands.

At step 326, user equipment [110] having the home IMSI may re-scan the at least one first network available in the first location to transmit the attach request to the at least one first network, wherein the attach request will now comprise the home IMSI of the user equipment [110].

At step 328, the user equipment [110] may now be enabled to avail the at least one service while leaving the international roaming by using the proactive commands in an event the at least one first network accepts the new attach attempt of the user equipment [110]. The method [300] terminates at step 330.

Therefore, the present invention encompasses a system and methods for availing the services by the user equipment when the user is either in the international roaming or is leaving the international roaming. The present invention further encompasses triggering the Auto IMSI Switch SIM application by using proactive commands and further replacing of the home IMSI with the global IMSI and vice versa, irrespective of the cause code sent by the user, thereby providing a robust solution in any international roaming scenario covering all the rejection cause codes of the user equipment's attach attempt. This in turn helps in reducing the probability of the failure of providing service to the users in the international locations and consequently provide seamless user experience in international roaming scenarios without any deterrence in international location.

Though a limited number of the user equipment [110], the subscriber identity module [120] and the components/sub systems therein, have been shown in the figures; however, it will be appreciated by those skilled in the art that the system [100] of the present disclosure encompasses any number and varied types of the entities/elements user equipment [110], the subscriber identity module [120] and the components/sub systems therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for availing at least one service by a user equipment while in an international roaming, the method comprising:
    transmitting, by the user equipment an attach request to at least one second network in an event the user equipment having a home International Mobile Subscriber Identity (IMSI) is in the international roaming by entering a second location from a first location, wherein
        the first location is served by at least one first network and the second location is served by the at least one second network, and
        the home IMSI corresponds to the first location;
    receiving, by the user equipment, an attach reject in response to the attach request, wherein the attach reject is received from the at least one second network;
    updating, by the user equipment, at least one location parameter of the second location at the subscriber identity module, wherein
        the subscriber identity module is configured at the user equipment, and
        the at least one location parameter has an associated status;
    analysing, by the subscriber identity module, the associated status of the at least one location parameter of the second location;
    requesting, by the subscriber identity module, to receive at least one network parameter of the at least one second network from the user equipment in an event the associated status of the at least one location parameter corresponds to the attach reject;
    communicating, by the user equipment, the at least one network parameter of the at least one second network to the subscriber identity module, wherein the at least one network parameter comprises a mobile country code of the second location;
    replacing the home IMSI of the user equipment with a global IMSI, by the subscriber identity module, in an event the at least one network parameter corresponds to the second location;
    re-transmitting, by the user equipment having the global IMSI, the attach request to the at least one second network; and
    availing, by the user equipment, the at least one service while in the international roaming in an event the at least one second network accepts the attach request with the global IMSI.

2. The method as claimed in claim 1, further comprising notifying an event data to the subscriber identity module, wherein the event data comprises update of at least one elementary file present in the subscriber identity module.

3. The method as claimed in claim 1, wherein the at least one service comprises at least one of a voice call, a multimedia broadcast multicast message, a voice message, a short message service, a VoIP data, a video data and an internet data.

4. The method as claimed in claim 1, wherein the attach request comprises one of the home IMSI and the global IMSI.

5. The method as claimed in claim 1, wherein the first location corresponds to a home location of the subscriber identity module.

6. The method as claimed in claim 1, wherein the second location corresponds to a location other than the home location of the subscriber identity module.

7. The method as claimed in claim 1, wherein the attach reject comprises at least one Evolved Packet System Mobility Management (EMM) cause of the network rejection.

8. The method as claimed in claim 1, wherein the at least one location parameter of the second location comprises at least one of a location information ($EF_{LOCI}$), a packet switched location information ($EF_{PSLOCI}$) and an EPS location information ($EF_{EPSLOCI}$).

9. The method as claimed in claim 1, wherein updating the at least one location parameter is based on type of the at least one second network comprising one of 2G, 3G and 4G.

10. The method as claimed in claim 1, wherein the associated status of the at least one location parameter of the second location indicates one of a attach reject and an attach acceptance by the at least one second network.

11. The method as claimed in claim 1, wherein the at least one network parameter of the at least second network further comprises a mobile network code of the second location.

12. A method for availing at least one service by a user equipment while leaving an international roaming, the method comprising:
    transmitting, by the user equipment, an attach request to at least one first network in an event the user equipment having a global International Mobile Subscriber Identity (IMSI) leaves the international roaming by entering a first location from a second location, wherein
        the first location is served by at least one first network and the second location is served by the at least one second network;
    receiving, by the user equipment, an attach reject in response to the attach request, wherein the attach reject is received from the at least one first network;
    updating, by the user equipment, at least one location parameter of the first location at the subscriber identity module, wherein the subscriber identity module is configured at the user equipment, and the at least one location parameter has an associated status;

analysing, by the subscriber identity module, the associated status of the at least one location parameter of the first location;

requesting, by the subscriber identity module, to receive at least one network parameter of the at least one first network from the user equipment in an event the associated status of the at least one location parameter corresponds to the attach reject;

communicating, by the user equipment, the at least one network parameter of the at least one first network to the subscriber identity module, wherein the at least one network parameter comprises a mobile country code of the first location;

replacing the global IMSI of the user equipment with a home IMSI, by the subscriber identity module, in an event the at least one network parameter corresponds to the first location, wherein the home IMSI corresponds to the first location;

re-transmitting, by the user equipment having the home IMSI, the attach request to the at least one first network; and availing, by the user equipment, the at least one service while leaving the international roaming in an event the at least one first network accepts the attach request with the home IMSI.

13. The method as claimed in claim 12, further comprising notifying an event data to the subscriber identity module, wherein the event data comprises update of at least one elementary file present in the subscriber identity module.

14. The method as claimed in claim 12, wherein the at least one location parameter of the first location comprises at least one of a location information ($EF_{LOCI}$), a packet switched location information ($EF_{PSLOCI}$) and an EPS location information ($EF_{EPSLOCI}$).

15. The method as claimed in claim 12, wherein the at least one network parameter of the at least first network further comprises a mobile network code of the first location.

16. A system for availing at least one service by a user equipment while one of in an international roaming and leaving the international roaming, the system comprising:

a user equipment configured to:

transmit an attach request to at least one second network in an event the user equipment having a home International Mobile Subscriber Identity (IMSI) is in the international roaming by entering a second location from a first location, and transmit an attach request to at least one first network in an event the user equipment having a global IMSI leaves the international roaming by entering the first location from the second location, wherein the first location is served by at least one first network and the second location is served by the at least one second network, and the home IMSI corresponds to the first location;

receive an attach reject event in response to the attach request from one of the at least one first network and the at least one second network;

update at least one location parameter of one of the first location and the second location at a subscriber identity module, wherein the subscriber identity module is configured at the user equipment, and the at least one location parameter has an associated status;

communicate at least one network parameter of one of the at least one second network and the at least one first network to the subscriber identity module, wherein the at least one network parameter of the at least one first network and the at least one second network comprises a mobile country code of the first location and the second location, respectively;

the subscriber identity module configured to:

analyse the associated status of the at least one location parameter of one of the first location and the second location;

request to receive the at least one network parameter of one of the at least one second network and the at least one first network from the user equipment in an event the associated status of the at least one location parameter corresponds to the attach reject;

replace the home IMSI of the user equipment with the global IMSI in an event the at least one network parameter corresponds to the second location;

replace the global IMSI of the user equipment with the home IMSI in an event the at least one network parameter corresponds to the first location;

wherein, the user equipment having one of the home IMSI and the global IMSI is configured to re-transmit the attach request to one of the at least one first network and the at least one second network to avail the at least one service while one of in the international roaming and leaving the international roaming in an event the at least one first network and the at least one second network accepts the home IMSI and the global IMSI, respectively.

17. The system as claimed in claim 16, wherein the user equipment is further configured to notify an event data to the subscriber identity module, wherein the event data comprises update of at least one elementary file present in the subscriber identity module.

* * * * *